(No Model.)   5 Sheets—Sheet 1.
A. R. GUSTAFSON.
MANGLE.
No. 535,133.   Patented Mar. 5, 1895.
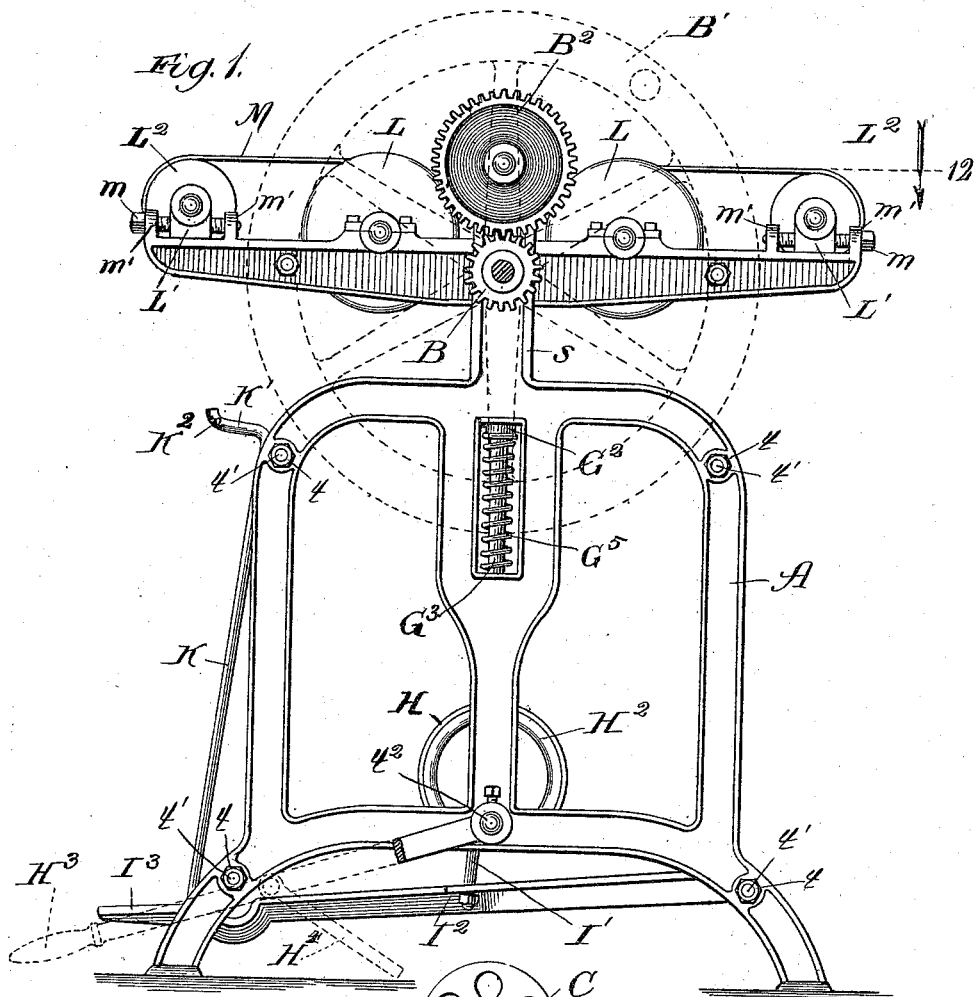
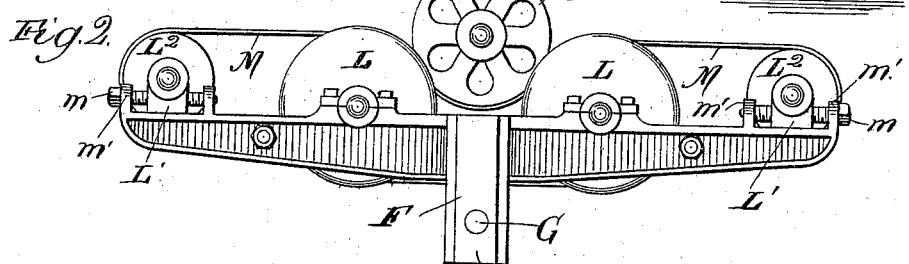
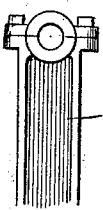
Witnesses:
Inventor:
Axel R. Gustafson, (No Model.)  5 Sheets—Sheet 2.

A. R. GUSTAFSON.
MANGLE.

No. 535,133. Patented Mar. 5, 1895.

Witnesses:

Inventor:
Axel R. Gustafson, (No Model.) 5 Sheets—Sheet 3.
A. R. GUSTAFSON.
MANGLE.
No. 535,133. Patented Mar. 5, 1895.
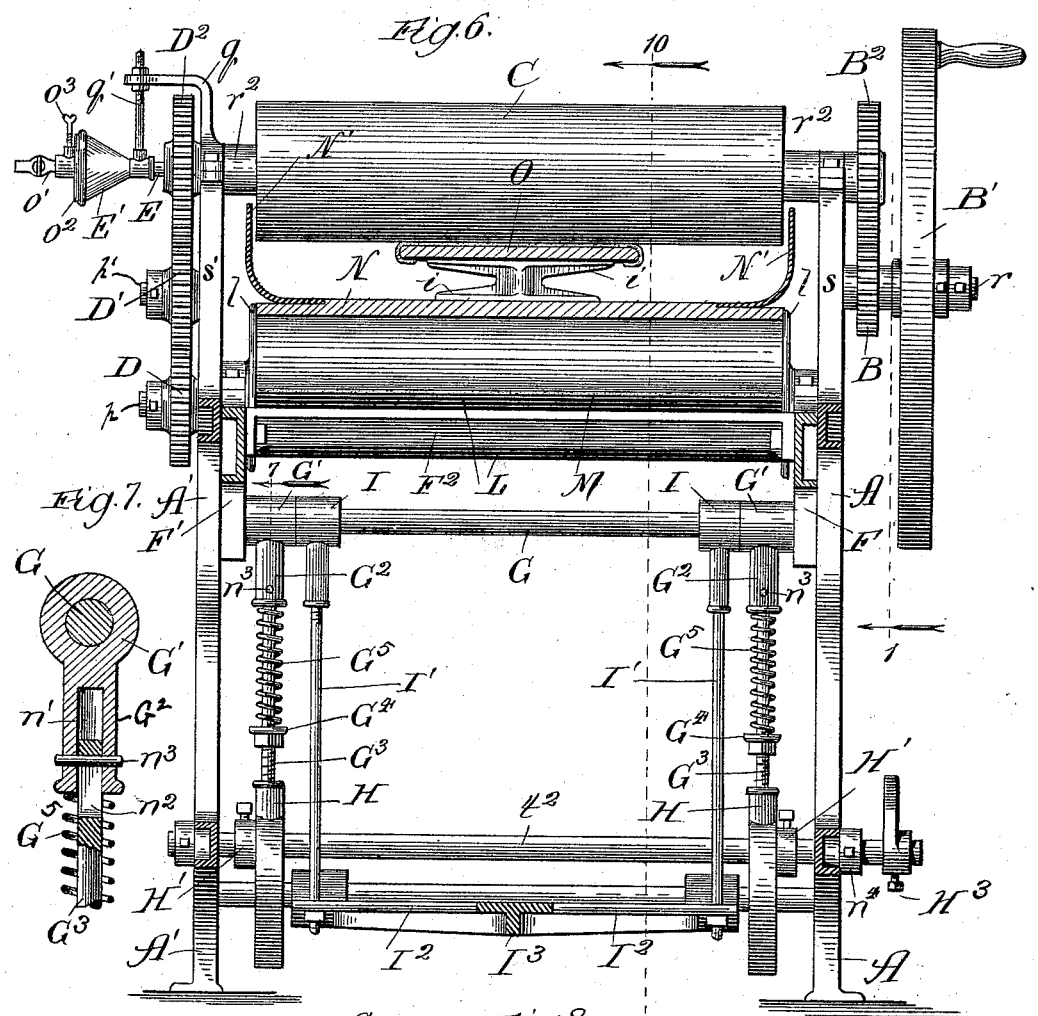
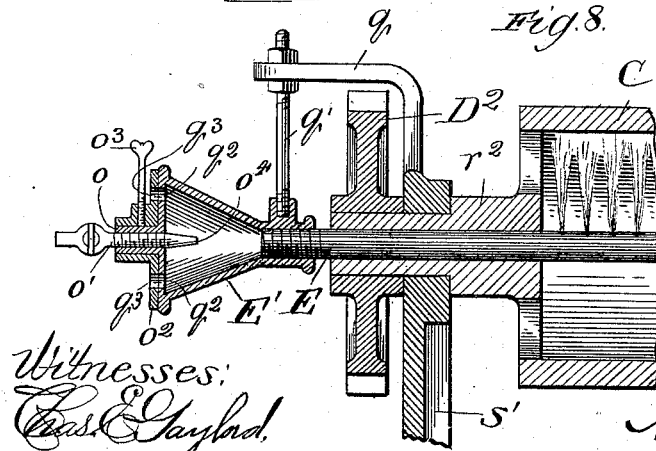
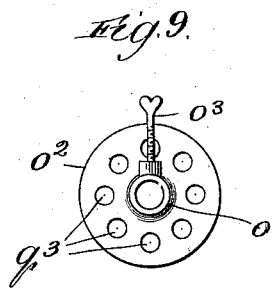
Witnesses:
Chas. E. Gaylord
W. H. Williams
Inventor:
Axel R. Gustafson,
By Davenport & Davenport
Attys (No Model.)
A. R. GUSTAFSON.
MANGLE.
No. 535,133. Patented Mar. 5, 1895.
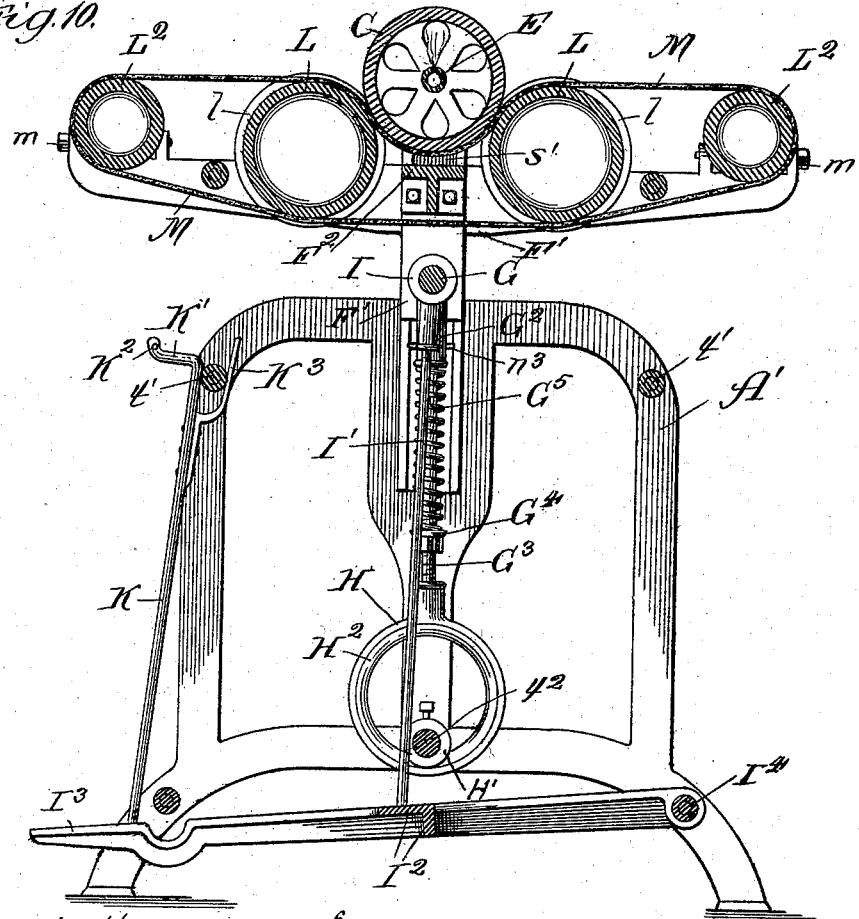
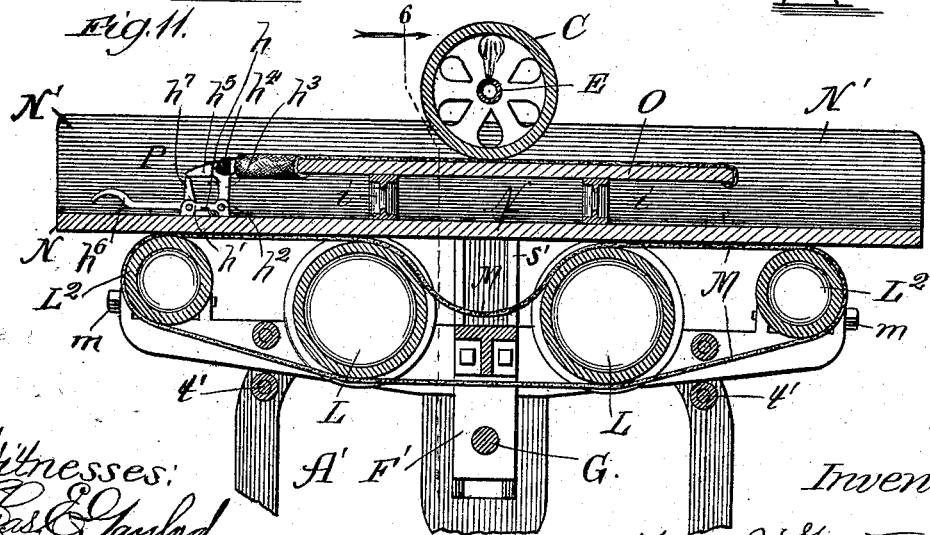

(No Model.)  5 Sheets—Sheet 5.

A. R. GUSTAFSON.
MANGLE.

No. 535,133.  Patented Mar. 5, 1895.

Witnesses:
Inventor:
Axel R. Gustafson,
By Davenport & Davenport
Attys.

UNITED STATES PATENT OFFICE.

AXEL R. GUSTAFSON, OF CHICAGO, ILLINOIS, ASSIGNOR OF ONE-HALF TO WILLIAM F. ANDERSON, OF NEGAUNEE, MICHIGAN.

MANGLE.

SPECIFICATION forming part of Letters Patent No. 535,133, dated March 5, 1895.

Application filed September 12, 1893. Serial No. 485,339. (No model.)

*To all whom it may concern:*

Be it known that I, AXEL R. GUSTAFSON, a citizen of the United States, residing at Chicago, in the county of Cook and State of Illinois, have invented a new and useful Mangle, of which the following is a specification.

My invention relates to an improvement in mangles.

The object of my invention is to produce a mangle-machine which shall be simple and economic in construction and rapid in operation, and which shall be capable of use both for plain or flat work and the polishing of collars, cuffs and shirt-bosoms.

Figure 4:
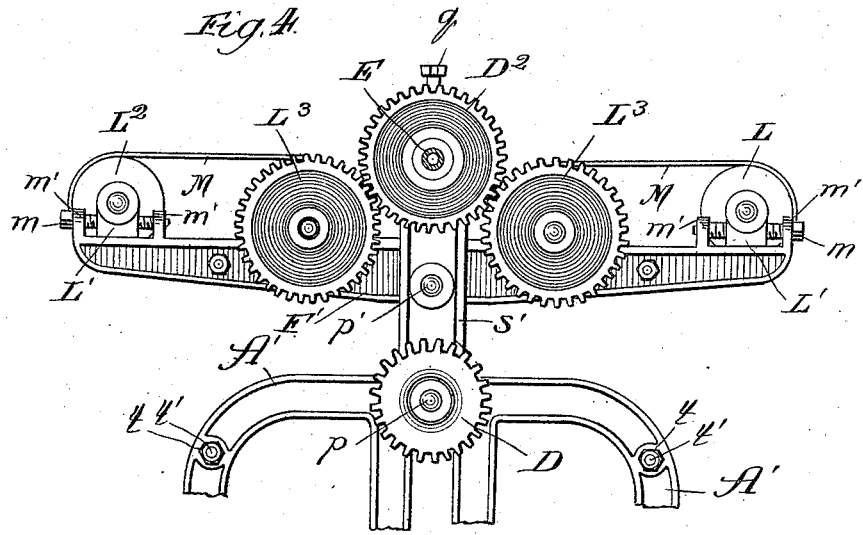
Figure 5:
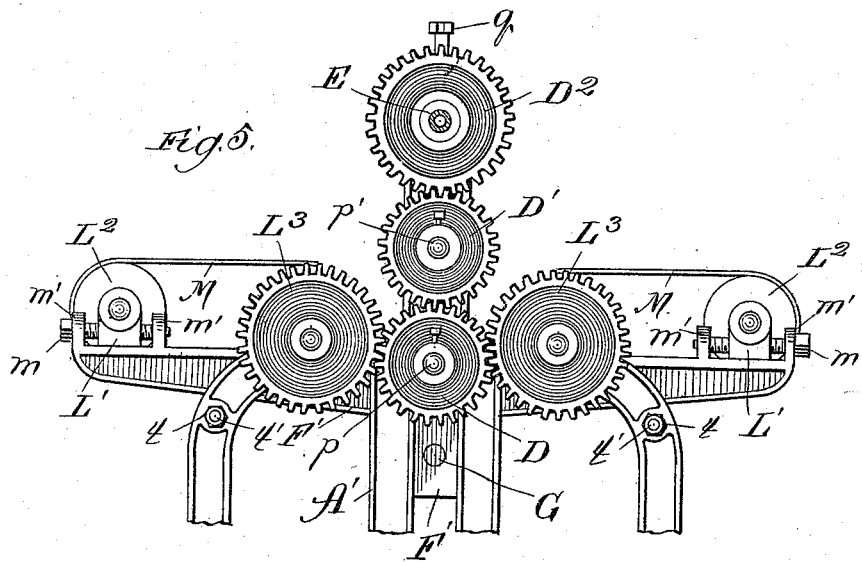
Figure 12:
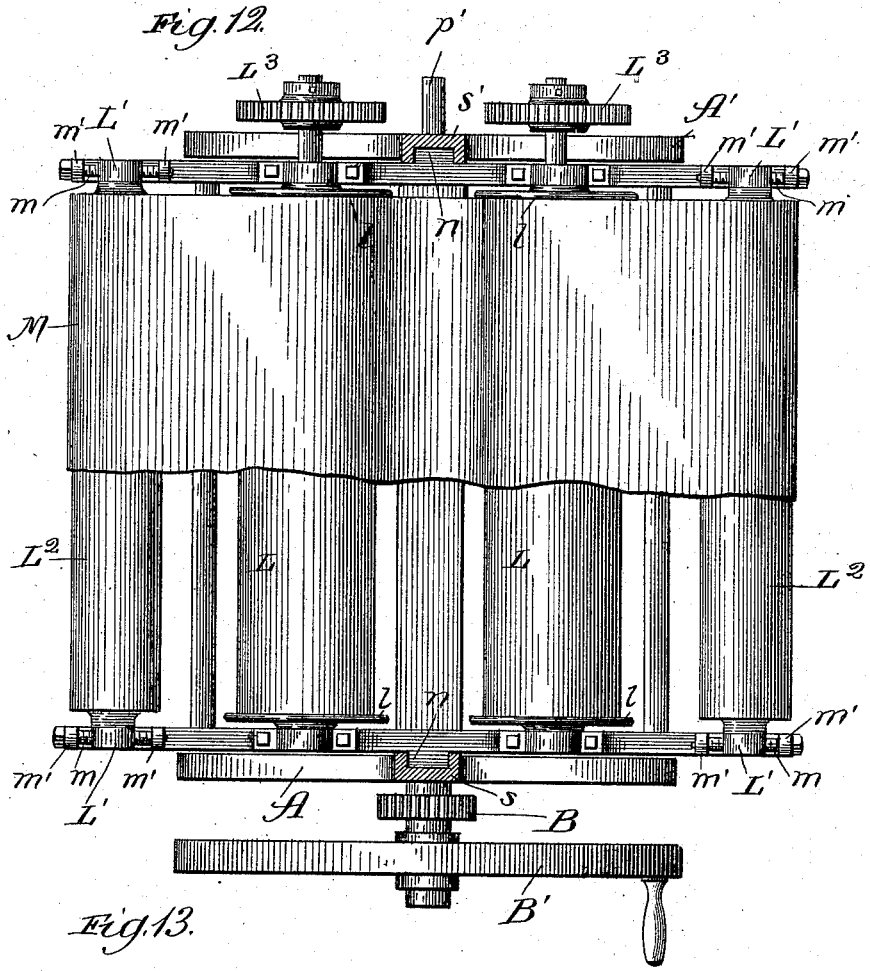
Figure 13:
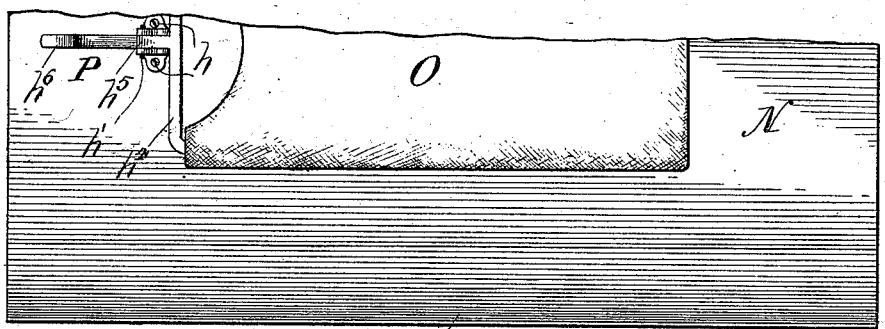

Referring to the accompanying drawings—Figure 1 is a side elevation of a mangle constructed in accordance with my invention, the apron being shown in its higher position, said view being taken at the line 1 on Fig. 6. Fig. 2 is a view in end elevation of the apron-frame and heated roller, the view being taken at the opposite side of the machine from that shown in Fig. 1. Fig. 3 is a broken detail of a vertically extending guide. Fig. 4 is a view in side elevation of the upper part of the machine showing the apron in its elevated position and the arrangement of gearing for driving it in this position. Fig. 5 is a view, similar to Fig. 4, showing the apron depressed and the arrangement of gear for driving it in this position. Fig. 6 is a vertical transverse section taken through the machine with the apron in its lower position at the line 6 on Fig. 11 and viewed in the direction of the arrow. Fig. 7 is a sectional view of a detail taken at the line 7 on Fig. 6. Fig. 8 is a vertical sectional view of the gas-supplying device for the heated roller. Fig. 9 is a view in elevation of the damper-plate, detached, employed with the burner. Fig. 10 is a longitudinal sectional view on the line 10 of Fig. 6 and viewed in the direction of the arrow, the apron-frame being, however, shown in its elevated position. Fig. 11 is a view similar to that of Fig. 10 confined to the upper part of the machine and showing the bosom-board introduced and the apron-frame in its lower position. Fig. 12 is a broken sectional view of the apron in its frame, the section being taken at the line 12 on Fig. 1 and viewed in the direction of the arrow; and Fig. 13 is a broken plan view of the bosom-board table showing the bosom-board in position thereon.

A, A', represent the members of the frame of the machine, which are connected by tie-rods $t'$ receiving nuts $t$ at their outer ends and surrounded between the members A, A', with gas piping. The purpose is to provide a stanch and rigid frame which shall at the same time be as light as practicable. The member A of the frame, which throughout is made of iron in angle form for strength, is of a form to present the vertical-extending guide $s$; and the member A' is similarly provided with a vertical-extending guide $s'$, the purpose of which will be presently described.

Extending from the guide-plate $s$ at a suitable point is a stud $r$ carrying the pinion B and wheel B'. The upper end of the guide-plate $s$ constitutes a bearing for one end of the shaft $r^2$ of the mangle-roller C, and the outer end of the shaft $r^2$ carries the gear-wheel B². It should be stated that the pinion B and gear B² are maintained always in mesh, so that the roller C is rotated by turning the wheel B' either by hand or other power.

The opposite member A' having the upward-extending guide-plate $s'$, carries a stud $p$ which affords a bearing for the gear-wheel D, which is permanently held to its stud. Its upper end affords a bearing for the opposite end of the shaft $r^2$, and at an intermediate point it is provided with a stud $p'$ which is adapted to receive the removable pinion D'. The shaft $r^2$ also carries at this end of the machine a gear-wheel D², and as will appear from the description hereinafter contained, the gears L³ on the rollers L are adapted to mesh with the gear D² when the apron frame is raised, while when the apron-frame is lowered, the gears L³ mesh with the gear D. When the apron-frame is lowered the gears L³ are separated from the gear D², and the intermediate gear D' is adapted to be introduced between the gears D and D², whereby the motion of the gear D² may be transmitted to the gears L³ of the apron rollers.

The mangle-roller C is hollow and open at one end, where it is provided with a head having a central perforation through which is introduced a pipe E. From the guide-plate $s'$ extends upward and outward an angle-bar $q$, and a tie-rod $q'$ extends from the cup at the end of the pipe E to the angle-bar, the connection with which is effected in the common manner by screw-threads and nuts. The outer end of the pipe E carries a flaring cup E', the head of which is perforated at $q^2$ in an annular line. The head of the cup E' has a central internally threaded projection $o$, which receives the nozzle $o'$ through which the gas is admitted, and serves as a bearing for the rotary damper-plate $o^2$, said damper-plate having annular perforations $q^3$ capable of registering with the perforations $q^2$ in the head of the cup E', and carrying a set screw $o^3$ by which it may be turned upon the bearing afforded by the projection $o$ and held in adjusted position. The nozzle $o'$ terminates within the cup E', as shown at $o^4$. The pipe E has a series of perforations within the cylinder C, as is usual in devices of this nature.

The apron-frame comprises the opposite members F, F', held together by a T-bar $F^2$. At a central point each member F, F' has a rectangular outward projection $n$, which fits movably in the cavity of the central section of the members A and A' of the outer frame respectively. In addition to the T-bar $F^2$, and located below the latter, there extends from the part F and part F' of the apron-frame a tie-rod G. Within the apron-frame and supported toward each end of the tie-rod G is a T-coupling G' having the tubular downward extension $G^2$, into the bore $n'$ of which fits the upper end of a rod $G^3$, which rod is screw-threaded toward its lower end to receive the nut $G^4$, and between the nut $G^4$ and the tube $G^2$ the rod is encircled by a spring $G^5$. The upper extremity of the rod $G^3$ is slotted, as shown at $n^2$, and a pin $n^3$ passes transversely through the slot and the tubular part $G^2$ of the coupling. The purpose of this slot $n^2$ is to permit vertical play against the resistance of the spring between the rod $G^3$ and the coupling G', for a purpose presently described. The lower end of each rod $G^3$ carries a ring H. On a rock-shaft $t^2$ extending from the part A to the part A' of the frame there is mounted, near each end, a collar H' which carries the eccentric ring $H^2$. The eccentrics $H^2$ fit closely within the rings H and receive their movement by the rotation of the shaft $t^2$. For the purpose of rocking the shaft it is extended out beyond the frame through a collar $n^4$ and carries at its outer extremity a lever $H^3$. There being two or more eccentrics $H^2$, each operating a ring H and thus communicating a lifting and lowering motion to the rods $G^3$, it will be obvious that the movement of the lever $H^3$ will serve to raise or depress the apron-carrying-frame F, F' to bring the apron carried thereby toward or away from the mangle-roller C. On the lever $H^3$ is provided the dog $H^4$ which swings freely, and the function of which is to permit the lever $H^3$ to maintain a partly raised position, thereby to effect a change in the position of the eccentrics $H^2$, so that the apron-carrying-frame may be held at slightly different points in either the elevated or lowered position. The tie-rod G carries also the couplings I, the lower tubular ends of which receive the rods I', which, in turn, at their opposite ends, are loosely secured to the treadle-frame $I^2$, from which extends outward the treadle $I^3$ pivoted at the rear of the frame, as indicated at $I^4$. From its forward end there extends upward from the treadle $I^3$ a rod K bent forward at its upper end as indicated at K' and provided with the handles $K^2$, only one of which is shown, the other extending similarly from the opposite side of the bent end of the rod from that presented to view in the drawings. On the rear side the rod K carries the projecting guide-rod $K^3$. The location of the rod K is such that in its normal position the rod proper is in front of, and the guide-rod $K^3$ is in rear of, the upper tie-rod $t'$ at the front of the machine, but when the treadle $I^3$ is depressed, thereby through the rods I' depressing the apron-carrying frame against the springs $G^5$, the crook K' in the rod K slips under the tie-rod $t'$ and thus prevents the return of the treadle and holds the apron-carrying frame in its slightly depressed position. The purpose of this feature will appear when the function of the apparatus is more minutely described.

The apron-frame is provided with intermediate bearings for the main rollers L and adjustable end-bearings L' for the outer rollers $L^2$. The adjustable bearings L' comprise screw-threaded blocks each adapted to receive a screw $m$ revolving in studs $m'$ on the frame. The apron M passes over the rollers L and $L^2$ and is endless, and it will be apparent that by turning the set-screws $m$ the tension of the apron may be varied. Each of the intermediate rollers L carries at one end a gear-wheel $L^3$, and these gear-wheels are adapted to mesh with the gear $D^2$ or the gear D, depending upon whether the apron-frame is elevated or depressed. The motion in the apron is produced by power transmitted through the gears from the wheel B'.

Each end of each roller L presents a flange $l$ and the apron M passes over the roller between the flanges. The purpose of these flanges is to afford lateral guides for the table N. On the table N, on each side, extend upward the curved plates N', one at each end of the roller C. The table N has central blocks $i$ upon which rests the bosom-board O. Toward its forward end at a central position there is secured to the board N the bosom-clamp P, which comprises a plate $h$ adapted to be bolted to the table N and having the ears $h'$, $h^2$. To the ears $h^2$ is pivoted the upward-extending arm $h^3$ terminating in the laterally-extending arms $h^4$ (Fig. 13) and the rear-extending tail-piece $h^5$. In the ears $h'$ is hung the handle $h^6$, terminating at the inner end in the upwardly extending dog $h^7$.

The clamp P operates as follows: A bosom having been placed upon the bosom-board and the handle $h^6$ of the clamp elevated, the depression of this handle causes engagement of the dog $h^7$ and tail-piece $h^5$, which forces the arms $h^4$ against the board, clamping the shirt thereon, the handle $h^6$ being still further depressed until the dog $h^7$ passes to the end of the tail-piece to the position indicated in Fig. 11. In this position the arms are held in firm contact with the bosom-board while the clamp in no way interferes with the operation of the machine.

The operation is as follows: Where plain or flat work is required in a mangle, the burner in the mangle-roller having been lighted and the gear $D'$ removed, the lever $H^3$ is thrown over to the position indicated in Fig. 1, whereby, by throwing up the eccentrics, the apron-frame is raised to its highest position wherein the gear $D^2$ is in direct engagement with the gears $L^3$ on the apron-rollers L. Power now being applied to the wheel $B'$ the apron and mangle-roller are respectively set in motion. To introduce plain work between the mangle roller and apron-frame, if the contact be such as to make the introduction difficult, it becomes necessary to depress the treadle $I^3$, holding it in its depressed position through the medium of the rod K, as previously described, and to withdraw the rod K after the work is introduced. When polishing work is to be done, such as collars, cuffs and shirt-bosoms, the lever $H^3$ is thrown over to the opposite position, thereby causing the eccentrics $H^2$ to assume the position indicated in Fig. 6, drawing downward the apron-carrying-frame and breaking engagement between the gear-wheel $D^2$ and gears $L^3$. In this position the gears $L^3$ are in mesh with the gear D, and the removable gear $D'$ is applied to its stud, thus completing the chain between the gear-wheel $D^2$ and the gears $L^3$. By depressing the treadle $I^3$ the apron-carrying-frame is again depressed against the resistance of the springs $G^5$, and the board N together with the bosom-board O is introduced under the mangle-roller.

The importance of the mechanism involved in the rod K, treadle $I^3$ and rods $I'$ may be readily understood, but it is recalled that the pressure required between the mangle-roller and the apron or between the mangle-roller and bosom-board is very severe, and that it frequently happens that the bosom-board in the movement of the machine passes beyond the mangle-roller and can not return unless the table N is lowered. Therefore, besides affording greater convenience in introducing the work into the mangle, the mechanism here referred to permits the machine to operate with less interruption than has been possible, so far as I am aware, with machines which have preceded it in the art.

In Fig. 10 the rods $I'$ are longer than the rods $I'$ in Fig. 6. When the machine is arranged as in Fig. 6, shorter rods $I'$ may be substituted for the longer rods shown in Fig. 10, or the rods may be originally as long as presented in Fig. 10 and shortened by screwing up the nuts shown on their lower ends in arranging the machine according to Fig. 6. Thus the treadle and the rod K will be operative in both positions of the roller-frame.

The arrangement of eccentrics for the ready lifting and lowering of the apron-frame, while preferred by me, is not to be understood as an essential part of the invention. A machine constructed for the best results will, in my opinion, have superior advantages if the eccentric mechanism be employed, but I do not limit my invention thereto. It will be quite apparent that any convenient power may be applied to turn the mangle-roller, and while I have shown a hand-wheel $B'$, it is to be understood that my invention is not limited thereto.

An exceedingly important feature of my improved mangle is that of having the apron-rollers L, L disposed on the vertically adjustable apron-frame at opposite sides of a vertical line through the center of the mangle-roller C. This enables the mangle-roller to operate and perform its ironing-function simultaneously at two sides of its horizontal center, namely, in conjunction with both rollers L; and the interposed section of the apron affords a surface for the mangle-roller to work against and exert a drying function on the interposed work.

What I claim as new, and desire to secure by Letters Patent, is—

1. In a mangle, the combination with the heated roller of a vertically adjustable apron-carrying frame, apron-rollers therein disposed at opposite sides of a vertical line through the center of the heated roller to co-operate therewith, gears on the apron-rollers a gear $D^2$ on the heated roller, a gear D, means for raising and lowering said frame, and a gear $D'$ removably journaled between the gears D and $D^2$, substantially as and for the purpose set forth.

2. In a mangle, the combination of the heated roller provided with means for rotating it, an apron-frame, the apron-rollers and apron thereon, the main apron-rollers being disposed at opposite sides of a vertical line through the center of the heated roller and having a gear-connection therewith, spring-encircled rods depending from and supporting the apron-frame, eccentrics mounted on a shaft and adapted to operate said rods, and a lever for rotating said shaft and eccentrics to raise and lower the apron-frame, substantially as described.

3. In a mangle, the combination of the heated roller, the apron-frame, the apron-rollers and apron thereon, the main apron-rollers being disposed at opposite sides of a vertical line through the center of the heated roller, spring encircled supports for the apron-frame, rods depending from said apron frame, and a treadle loosely connected with said rods, whereby the apron-frame may be depressed against the tension of the springs of said support, substantially as and for the purpose set forth.

4. A mangle comprising, in combination, the members A, A', of the frame the heated roller C supported at the top of said frame, the apron-carrying frame having lateral projections $n$ engaging and moving in guides in said frame, spring-encircled rods $G^3$ supporting said apron-frame, and means for moving said rods in vertical direction, thereby raising and lowering the apron-frame, rods I' connected to said apron-frame at their upper ends and a treadle-frame loosely connected with said rods at their lower ends, a treadle, and a rod K having the crook and engaging a tie-rod when the treadle is depressed, the parts being arranged substantially as described, whereby the apron-frame may be raised and lowered with relation to the heated roller for direct co-operation therewith or for the insertion of a bosom-board, and the frame may be moved against the tension of its sustaining springs for widening the distance between the roller and apron or the roller and bosom-board, all as set forth.

AXEL R. GUSTAFSON.

In presence of—
M. J. FROST,
W. N. WILLIAMS.